United States Patent
Urmese et al.

(10) Patent No.: US 10,819,579 B2
(45) Date of Patent: Oct. 27, 2020

(54) PRIORITIZING CAPACITIES BASED ON PRIORITY PARAMETERS

(71) Applicant: VMWARE, INC., Palo Alto, CA (US)

(72) Inventors: Nidhin Urmese, Bangalore (IN); Akshay Bhandari, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/373,665

(22) Filed: Apr. 3, 2019

(65) Prior Publication Data

US 2020/0228407 A1 Jul. 16, 2020

(30) Foreign Application Priority Data

Jan. 16, 2019 (IN) .............................. 201941001931

(51) Int. Cl.
| | |
|---|---|
| G06F 15/16 | (2006.01) |
| H04L 12/24 | (2006.01) |
| H04L 29/08 | (2006.01) |
| G06F 9/455 | (2018.01) |
| H04L 12/46 | (2006.01) |

(52) U.S. Cl.
CPC ...... *H04L 41/0896* (2013.01); *G06F 9/45558* (2013.01); *H04L 12/4641* (2013.01); *H04L 67/1097* (2013.01); *H04L 67/16* (2013.01); *H04L 67/2809* (2013.01); *H04L 67/322* (2013.01)

(58) Field of Classification Search
CPC ............. H04L 41/0896; H04L 12/4641; H04L 67/1097; H04L 67/16; H04L 67/2809; H04L 67/322; G06F 9/45558
See application file for complete search history.

(56) References Cited

U.S. PATENT DOCUMENTS

| | | | |
|---|---|---|---|
| 2008/0049786 A1* | 2/2008 | Ram | G06F 9/5083 370/468 |
| 2016/0337180 A1* | 11/2016 | Rao | H04L 41/0803 |
| 2017/0220392 A1* | 8/2017 | Cropper | G06F 9/5077 |

* cited by examiner

*Primary Examiner* — Normin Abedin
(74) *Attorney, Agent, or Firm* — Patterson + Sheridan, LLP (57) ABSTRACT

Certain aspects of the present disclosure relate to methods and systems for selecting one of a plurality of capacities to provide a service for a client machine in a multi-cloud virtual desktop infrastructure (VDI) system. In certain aspects, a method receiving a request for the service from the client machine, the request indicating a first bandwidth rating associated with the first capacity and a second bandwidth rating associated with the second capacity. The method further includes prioritizing the first capacity over the second capacity based on a first one or more priority parameters associated with the first capacity and a second one or more priority parameters associated with the second capacity. The method further includes indicating a first identifier of the service associated with the first capacity to the client machine, wherein the client machine uses the first identifier to connect to the service at the first capacity.

18 Claims, 3 Drawing Sheets

PRIORITIZING CAPACITIES BASED ON PRIORITY PARAMETERS

RELATED APPLICATIONS

Benefit is claimed under 35 U.S.C. 119(a)-(d) to Foreign Application Serial No. 201941001931 filed in India entitled "PRIORITIZING CAPACITIES BASED ON PRIORITY PARAMETERS", on Jan. 16, 2019, by VMWARE, Inc., which is herein incorporated in its entirety by reference for all purposes.

BACKGROUND

Server-based computing allows a networked client machine, remotely situated with respect to a server computing system, to access computing resources on the server. For example, the client machine may run desktop client software (also referred to as virtual desktop infrastructure client software or "VDI client" for short) and hardware that uses a remote desktop protocol, such as Remote Desktop Protocol (RDP), Virtual Network Computing (VNC), or Personal Computer over Internet Protocol (PCoIP), to access a desktop or application running on the server computing system. The desktop client software displays an image of a graphical user interface (GUI) generated by the operating system and applications running at the server computing system. For example, a virtual machine running on the server computer system transmits to the networked client machine a continuous flow of GUI images generated by an operating system running on the virtual machine and applications running on the operating system. The virtual machine employs a remote desktop protocol and a virtual network interface card (VNIC) to communicate with the client machine.

An example use-case of the technology described above is an information technology (IT) department of an enterprise configuring client machines (e.g., desktops, laptops, etc.) of the enterprise's employees with the desktop client software to allow the employees to access desktops or applications running on server computing systems. Historically, enterprises have used server computing systems at an "on-premise" data center to provide computing resources to the client machines. An on-premise datacenter may be a data center controlled and administrated by the enterprise and may sometimes also be referred to as a "private" cloud system or cloud. With the advent of "public" clouds, however, many enterprises may use a combination of private and public clouds to extend the compute and/or storage resources available to themselves. A public cloud refers to a cloud computing system that is operated by a cloud computing service provider (e.g., Amazon Web Services (AWS), Google Cloud, etc.) and exposed as a service available to account holders, such as one or more enterprises.

With an enterprise that is set up with a multi-cloud infrastructure, when accessing a desktop or application, client machines may be configured to be able to use compute resources provided by any of the private and/or public cloud systems in the multi-cloud infrastructure. However, there may be a number of advantages in using one cloud over another.

DETAILED DESCRIPTION

Embodiments of the invention provide a method and system for selecting a capacity to provide a service (e.g., a remote desktop, application, etc.) for a client machine in a multi-cloud virtual desktop infrastructure (VDI) system based on one or more priority parameters.

Figure 1:
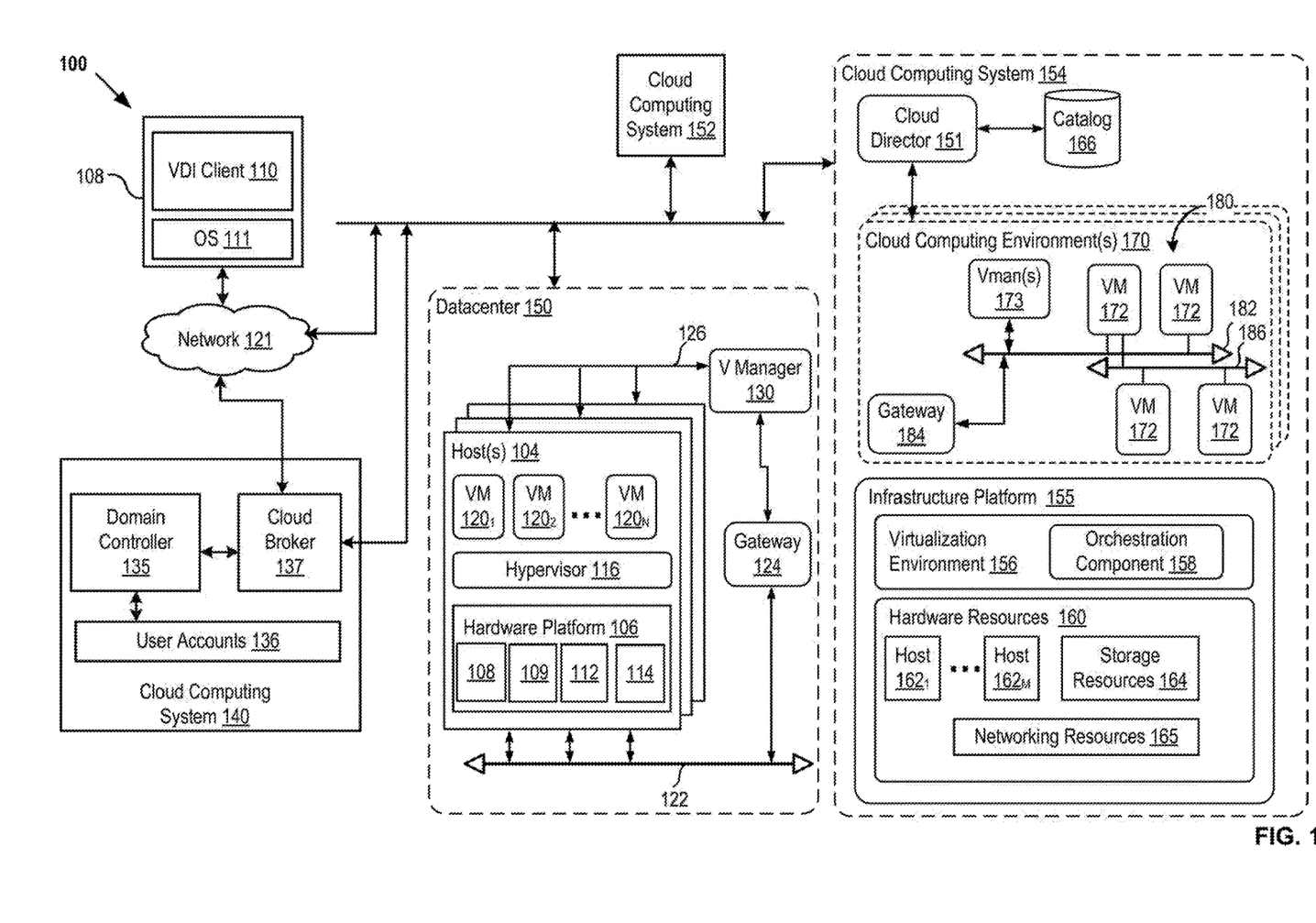
FIG. 1 illustrates components of a virtual desktop infrastructure (VDI) system in which one or more embodiments of the present invention may be implemented.

FIG. 1 illustrates components of a multi-cloud VDI system 100 in which one or more embodiments of the present invention may be implemented. In VDI system 100, VDI client software programs (also referred to as "VDI clients"), such as VDI client 110, run on operating systems of client machines. For example, FIG. 1 shows VDI client 110 running on operating system (OS) 111 of client machine 108. VDI client 110 provides an interface for a user of client machine 108 to access desktops or applications, executed by a server computer system (e.g., blade server) or virtual machines running in a server computer system in a data center that is remote from the users' locations. The term "desktop" may refer to the instance of an interactive operating environment provided by a computer operating system along with one or more software applications, typically in the form of a display and sound output and keyboard and mouse input, through which users can launch, interact with, and manage applications, settings, and data. The term "desktop" may also refer to a virtual machine or physical system accessed by an end user as a local (to the user) desktop or workstation computer. With VDI clients, users can access desktops running in a remote data center through network 121, from any location, using a general purpose computer running a commodity operating system and a VDI client software program such as VMware® View™, or a special purpose thin client such as those available from Dell, HP, NEC, Sun Microsystems, Wyse, and others. In certain cases, the desktops may instead be accessed through a web browser running on a commodity operating system backed by a general purpose computer even with no access to any VDI client software program.

In VDI system 100 of FIG. 1, VDI client 110 provides an interface for a user of client machine 108 to potentially access desktops or applications running on a virtual machine or server computer system at any one of data center 150, cloud computing system 152, or cloud computing system 154. Data center 150 is an example of a private cloud that is controlled and administered by an enterprise associated with client machine 108. Data center 150 may be an on-premise data center or a remote data center that is separate from an enterprise's on-premise infrastructure. Note that, as used herein, an internal cloud or "private" cloud is a cloud in which a tenant and a cloud service provider are part of the same enterprise or organization, while an external or "public" cloud is a cloud that is provided by an organization that is separate from a an enterprise that accesses the external cloud. Each of cloud computing systems 152 and 154 is an example of a public cloud that is operated by a cloud computing service provider (e.g., Amazon Web Services (AWS), Google Cloud, etc.) and exposed as a service available to the enterprise in addition to other enterprises.

VDI system 100 also includes a domain controller 135, such as Microsoft® Active Directory®, that manages user accounts 136 including user log-in information, and a cloud broker 137 that coordinates and manages connections between VDI client 108, or a web browser running on client machine 108, and desktops running in virtual machines or server computer systems at any one of data center 150, cloud computing system 152, or cloud computing system 154. Domain controller 135 and cloud broker 137 may run on separate servers or in separate virtual machines running on the same server or different servers. As shown, domain controller 135 and cloud broker 137 run in a public cloud computing system 140. Although not shown, cloud computing system 140 may comprise components that are similar to the components of cloud computing system 154, described in more detail below.

As described above, any one of data center 150, cloud computing system 152, or cloud computing system 154 may be capable of providing client machine 108 with access to a desktop or application requested by the user of client machine 108. Such desktops or applications may be executed by server computer systems or virtual machines running on such systems. FIG. 1 illustrates example components of an architecture within data center 150 and cloud computing system 154, where desktops and applications accessed by client machine 108 may run. Although not shown, cloud computing system 152 may comprise components that are similar to the components of cloud computing system 154, described in more detail below.

Datacenter 150 includes one or more host computer systems ("hosts 104"). Hosts 104 may be constructed on a server grade hardware platform 106, such as an x86 architecture platform. As shown, hardware platform 106 of each host 104 includes conventional components of a computing device, such as one or more processors (CPUs) 108, system memory 109, a network interface 112, storage system 114, and other I/O devices such as, for example, a mouse and keyboard (not shown). CPU 108 is configured to execute instructions, such as executable instructions that perform one or more operations described herein and that may be stored in memory 109 and in local storage. Memory 109 is a device allowing information, such as executable instructions, virtual disks, configurations, and other data, to be stored and retrieved. Memory 109 may include, for example, one or more random access memory (RAM) modules.

Network interface 112 enables host 104 to communicate with another device via a communication medium, such as a network 122 within datacenter 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems. Storage system 114 may also be representative of a storage virtualization platform, such as virtual SAN (VSAN) available by VMware, Inc., of Palo Alto, Calif.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an aspect described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104. Also, in certain aspects, hypervisor 116 may comprise system level software as well as a privileged VM machine (not shown) that has access to the physical hardware resources of host 104. Note that although certain aspects herein are described with respect to VMs, the same techniques may be applied to other types of VCIs. The term "VCI" may refer to VMs, containers, Docker containers, data compute nodes, isolated user space instances, namespace containers, and the like.

Datacenter 102 includes a virtualization management component (depicted in FIG. 1 as virtualization manager 130) that may communicate with the plurality of hosts 104 via a network, sometimes referred to as a management network 126. In certain aspects, network 122 and management network 126 may correspond to the same physical network, but different network segments, such as different subnets or different logical VLAN segments. In one aspect, virtualization manager 130 is a computer program that resides and executes in a central server, which may reside in datacenter 102, or alternatively, runs as a VM in one of hosts 104. One example of a virtualization manager is the vCenter Server™ product made available from VMware, Inc. Virtualization manager 130 is configured to carry out administrative tasks for data center 102, including managing hosts 104, managing VMs 120 running within each host 104, provisioning VMs, migrating VMs from one host to another host, and load balancing between hosts 104.

Gateway 124 (e.g., executing as a virtual appliance, such as in a VM) is configured to provide VMs 120 and other components in datacenter 102 with connectivity to an external network 140 (e.g., Internet). For example, gateway 124 may be configured to provide virtual private network (VPN) connectivity over a network another VPN endpoint, such as client machine 108. Gateway 124 may manage external public IP addresses for VMs 120 and route traffic incoming to and outgoing from datacenter 102 and provide networking services, such as firewalls, network address translation (NAT), dynamic host configuration protocol (DHCP), load balancing, and virtual private network (VPN) connectivity over a network 140.

VDI client 110 may provide a user of client machine 108 with access to a desktop and/or application by, for example, displaying an image of a graphical user interface (GUI) generated by an operating system running on a VM 120 and/or an application running on the operating system. In another example, VDI client 110 may display an image of a graphical user interface (GUI) generated by an operating system (not shown) of a host 104 and/or an application running on the host's operating system.

VDI client 110 may similarly provide the user of client machine 108 with access to a desktop and/or application executing within cloud computing systems 152 and 154. Cloud computing system 154 is configured to dynamically provide an enterprise associated with client machine 108, or users of the enterprise, with one or more cloud computing environments 170 in which a desktop and/or application may run on one of VMs 172. Cloud computing system 154 includes an infrastructure platform 155 upon which a cloud computing environment 170 may be executed. In the particular aspect of FIG. 1, infrastructure platform 155 includes hardware resources 160 having computing resources (e.g., hosts 162₁ to 162ₙ), storage resources 164, and networking resources 165, which are configured in a manner to provide a virtualization environment 156 that supports the execution of a plurality of virtual machines 172 across hosts 162. Storage resources 164 may include a storage area network (SAN), distributed virtual SAN, or network-attached storage (NAS) and other network data storage systems. Networking resources 165 may include switches, routers, and other network devices for connecting hosts 162 together and with network entities outside infrastructure platform 155. It is recognized that hardware resources 160 of cloud computing system 150 may in fact be distributed across multiple data centers in different locations.

Each cloud computing environment 170 may be associated with a particular tenant of cloud computing system 150, such as the enterprise providing data center 150. In certain aspects, cloud computing environment 170 may be configured as a dedicated cloud service for a single tenant comprised of dedicated hardware resources 160 (i.e., physically isolated from hardware resources used by other users of cloud computing system 150). In certain other aspects, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

Virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web application or to modify (e.g., scale) a currently running web application to support peak demands, orchestration component 158 can initiate and manage the instantiation of VMs 172 on hosts 162 to support such requests. In certain aspects, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to datacenter 102, virtualization environment 156 may be implemented by running VMware ESXi™-based hypervisor technologies on hosts 162. VMware ESXi™-based hypervisor technologies are provided by VMware, Inc. (although it should be recognized that any other virtualization technologies, including Xen® and Microsoft Hyper-V® virtualization technologies may be utilized consistent with the teachings herein).

In certain aspects, cloud computing system 150 includes a cloud director 151 (e.g., run in one or more virtual machines) that manages allocation of virtual computing resources to an enterprise for deploying applications. Cloud director 151 may be accessible to users via a REST (Representational State Transfer) API (Application Programming Interface) or any other client-server communication protocol. Cloud director 151 may authenticate connection attempts from the enterprise using credentials issued by the cloud computing provider. Cloud director 151 maintains and publishes a catalog 166 of available virtual machine templates and packaged virtual machine applications that represent virtual machines that may be provisioned in cloud computing environment 170. Cloud director 151 receives provisioning requests submitted (e.g., via REST API calls) and propagates such requests to orchestration component 158 to instantiate the requested virtual machines (e.g., VMs 172). One example of cloud director 151 is the VMware vCloud Director® produced by VMware, Inc.

In the aspect of FIG. 1, cloud computing environment 170 supports the creation of a virtual data center 180 having a plurality of virtual machines 172 instantiated to, for example, host deployed multi-tier applications, as well as one or more virtualization managers 173 (abbreviated as "Vman(s)"). A virtual data center 180 is a logical construct that provides compute, network, and storage resources to an enterprise. A single cloud computing environment 170 may support multiple virtual data centers 180, each providing resources to a separate enterprise. Virtual data centers 180 provide an environment where VMs 172 can be created, stored, and operated, enabling complete abstraction between the consumption of infrastructure service and underlying resources. VMs 172 may be configured similarly to VMs 120, of data center 105, as abstractions of processor, memory, storage, and networking resources of hardware resources 160. Virtualization managers 173 can be configured similarly to virtualization manager 130 of data center 105.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network another VPN endpoint, such as client machine 108. Although FIG. 1 depicts a single instance of a gateway 184, it is recognized that gateway 184 may represent multiple gateway components within cloud computing system 154. In some aspects, a separate gateway 184 may be deployed for each virtual data center, or alternatively, for each tenant. In some aspects, a gateway instance may be deployed that manages traffic with a specific tenant, while a separate gateway instance manages public-facing traffic to the Internet. In yet other aspects, one or more gateway instances that are shared among all the tenants of cloud computing system 154 may be used to manage all public-facing traffic incoming and outgoing from cloud computing system 154.

Client machine 108 may communicate with data center 150 as well as cloud computing systems 140, 152, and 154, via network 121. Network 121 may refer to a network of computers such as a local area network ("LAN"), a wide area network ("WAN"), or a network of networks, such as the Internet. For simplicity, a single network is shown but it should be recognized that, in actual implementations, the components of VDI system 100 may be connected over the same network or different networks. For example, client machine may communicate with data center 150 and cloud computing systems 140, 152, and 154 through multiple networks, including network 121. Similarly, cloud broker 137 may communicate with data center 150 and cloud computing systems 140, 152, and 154 though one or more networks, such as a LAN, a WAN, or the Internet. Furthermore, FIG. 1 illustrates only a particular configuration and architecture of an exemplary VDI system, but it should be recognized that one or more aspects of the present invention may be practiced with other configurations or architectures. For example, a different VDI system may include a different combination or number of public and private cloud systems. Also, another example VDI system may only include multiple public cloud systems or multiple private cloud systems.

In a multi-cloud VDI system, such as multi-cloud VDI system 100, a desktop or application (both may be referred to as a service) requested by a user of client machine may be available for provisioning at multiple cloud systems, including private cloud system(s) (e.g., data center 150) an/or public cloud system(s) (e.g., cloud computing systems 152 and 154). However, certain aspects or parameters associated with a cloud system may make using that cloud system more desirable as compared to some of the other cloud systems in the VDI system. For example, a particular cloud system may provide a higher bandwidth rate than the other cloud systems, thereby, allowing the user to experience a better quality of service while interacting with a desktop or application. A bandwidth rate associated with a cloud system corresponds to the maximum rate of data transfer by the cloud system. In another example, the costs associated with using computing resources of each of the cloud systems may be different.

Also, the physical distance between the client machine and each of the cloud systems may be different. The physical distance may impact how long it takes for data to travel between the client machine and a cloud system. Another example parameter may be the current resource availability of each cloud system. Current resource availability refers to, for example, the ratio of the number of available compute resources (e.g., VMs) over the overall number of compute resources allocated to a certain enterprise. For example, at one cloud system, eight of the ten virtual machines allocated to a certain enterprise may already be in use at the time a user of the enterprise requests a certain desktop. This ratio corresponds to a current resource availability of 20%. At another cloud system, five of the fifty virtual machines allocated to the enterprise may be in use, corresponding to a current resource availability of 90%. In such a situation, it may be advantageous to utilize the compute resources at the latter cloud system.

Accordingly, certain aspects described herein relate to providing a multi-cloud VDI system that is configured to prioritize private and/or public cloud systems, based on a number of parameters, when provisioning desktops or applications to client machines. More specifically, the multi-cloud VDI system provided herein comprises a number of components including a smart client module (SCM), installed on each client machine, as well as a number of bandwidth gauge modules (BGMs), each executing at a different cloud system for aiding SCMs in determining bandwidth information associated with the corresponding cloud system. The multi-cloud VDI system also provides a cloud broker configured with a set of priority rules or weights, which the cloud broker utilizes, in combination with information received from a smart client module, to prioritize or rank cloud systems when a corresponding client machine is requesting a desktop or application.

Figure 2:
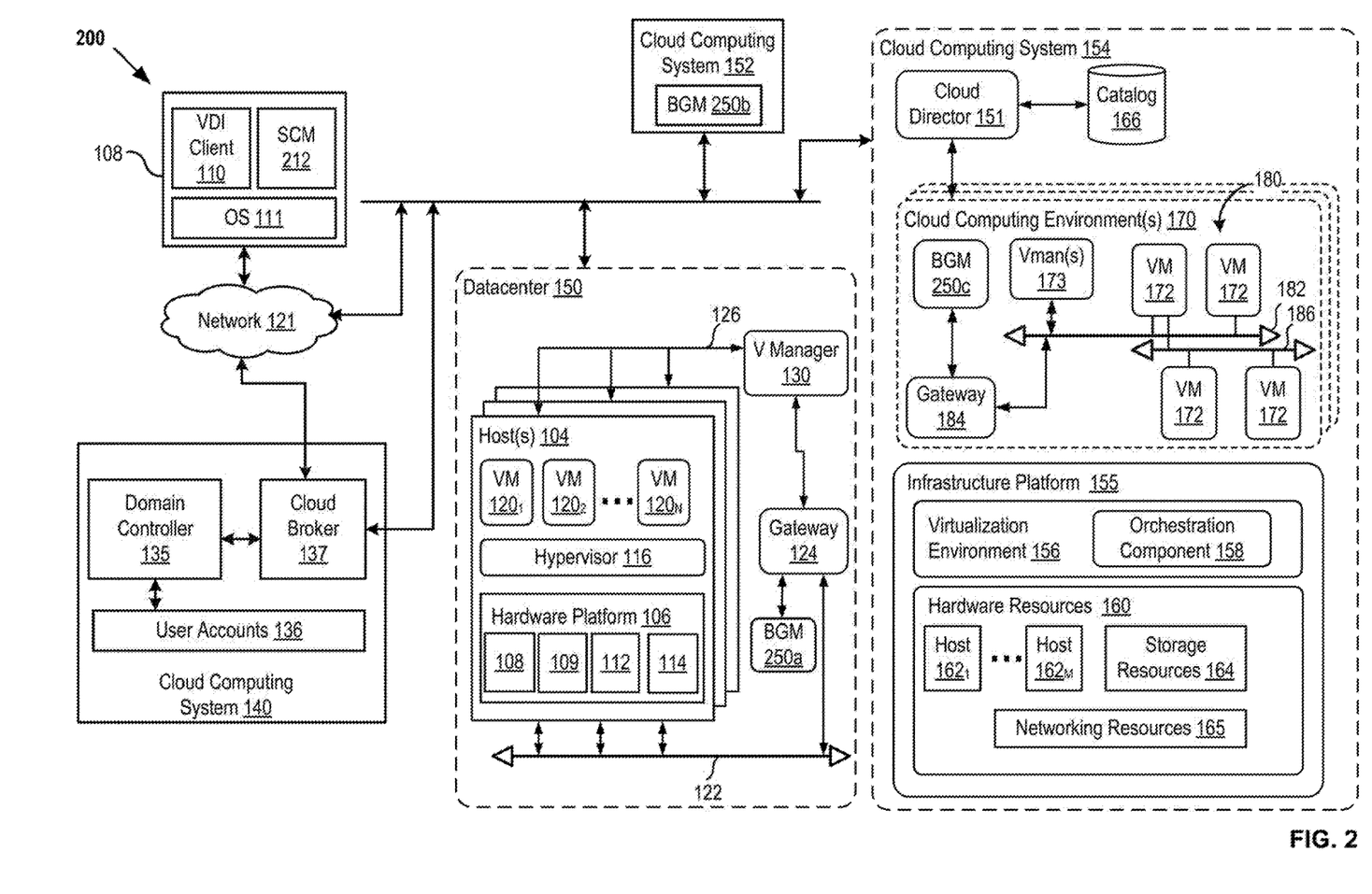
FIG. 2 illustrates multi-cloud VDI system that is configured with a smart client module (SMC), a number of bandwidth gauge modules (BGMs), and a cloud broker, according to one embodiment of the present invention.

FIG. 2 illustrates multi-cloud VDI system 200 that is configured with the components described above. As shown, SCM 212 is a software module that is executed in the user space of OS 111 of client machine 108. SCM 212 is configured to share the location of client machine 108 with cloud broker 137. SCM 212 is also configured to determine the bandwidth rate associated with each of datacenter 150 and cloud computing systems 152 and 154. For simplicity, each of datacenter 150 and cloud computing systems 152 and 154 may be referred to as a compute capacity or just "capacity." For example, datacenter 150 may be referred to as capacity 150. SCM 212 is able determine the bandwidth rate associated with each of capacities 150-154 by communicating with a BGM 250 executing at each of the capacities.

BGM 250 is a software module that is configured to determine the bandwidth rate associated with a corresponding capacity. For example, FIG. 2 shows BGM 250a executing at capacity 150. BGM 250a may run on a VM, such as a VM 120, or in the user space of a host 104's operating system. FIG. 1 also shows BGM 250c executing in a cloud computing environment 170 for determining the bandwidth rate associated with capacity 154. In certain aspects, the cloud computing environment 107 that hosts BGM 250c is associated with the enterprise corresponding to client machine 108. In certain aspects, BGM 250c may run on a VM, such as VM 172. Note that although in FIG. 2 BGM 250c is shown as executing in a cloud computing environment 170, in certain other aspects, BGM 250c may not execute as part of a cloud computing environment 170.

Figure 3:
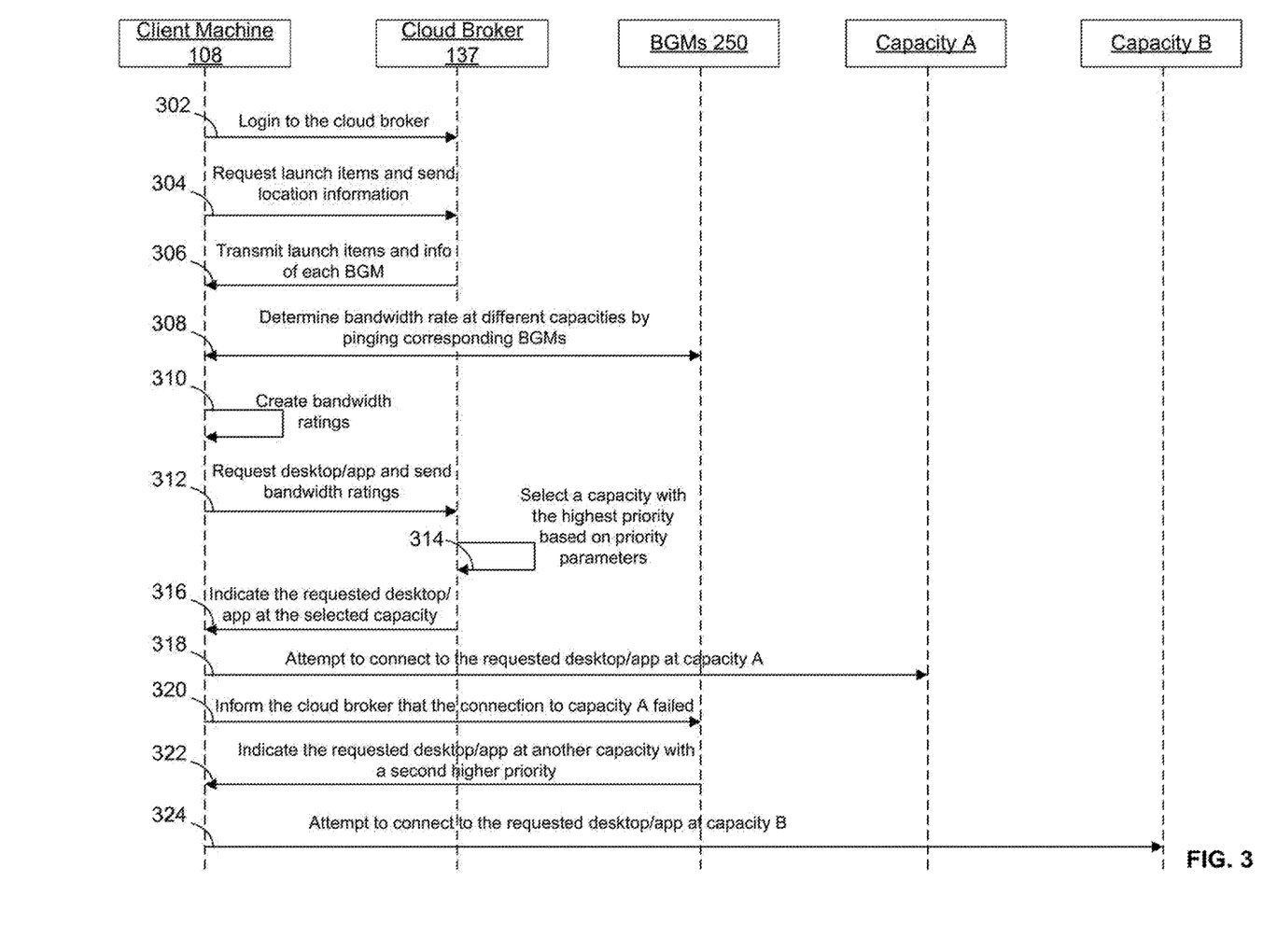
FIG. 3 illustrates a sequence diagram for selecting a certain desktop or application for a client machine based on one or more priority parameters, according to one embodiment of the present invention.

FIG. 3 illustrates example operations 300 for provisioning a client machine with a remote desktop or application executing in a certain capacity. Operations 300 are described herein with reference to FIG. 2. Further, operations 300 are described herein with references to capacity A and capacity B. In one example, capacity A and capacity may refer to capacity 150 and 154 of FIG. 2, respectively.

At step 302, a client machine logs into a cloud broker. For example, client machine 108 logs into cloud broker 137. More specifically, before attempting to access a desktop or application, in certain aspects, a user of client machine 108 may log into cloud broker 137 through VDI client 110. One of a number of authentication techniques may be used for verifying the identity of the user. Examples of such authentication techniques include password authentication, single sign-on, multi-factor authentication, etc. In certain aspects, a user does not attempt to access a desktop or application through VDI client 110. In such aspects, the user may log into cloud broker through a web-browser. An example of a protocol that allows a user of client machine 108 to access a remote desktop or application through a web browser is the Blast Hypertext Markup Language (HTML) protocol. Note that the techniques and aspects described herein can be implemented regardless of the technology (e.g., the type of VDI client or protocol) used for accessing a remote desktop or application.

At step 304, the client machine transmits a message to the cloud broker, where the message includes a request for launch items as well as location information of client machine 108 and other parameters. For example, SCM 212 of client machine 108 transmits a message to cloud broker 137, which includes a request for launch items (e.g., desktops and/or applications) well as location information of client machine 108 and other parameters. By querying cloud broker 137 for launch items, SCM 212 attempts to determine which desktops and/or applications are available to the client machine. Cloud broker 137 maintains information about each client machine 108 and what desktops and/or applications the client machine 108 is allowed to access. As such, when cloud broker 137 receives client machine 108's message, it is configured to determine which one or more of the desktops/applications that client machine 108 is allowed to access are available and at which capacities.

The location information of client machine 108, for example, indicates the latitude and longitude of where client machine 108 is located. The other parameters included in the message may provide additional information associated with client machine 108, such as client machine 108's name, domain, type, fully qualified domain name (FQDN), media access control (MAC) address, and IP address as well as the client ID and version associated with VD client 110, etc.

At step 306, the cloud broker transmits a response to the client machine, the response including a set of launch items that can be provided by one or more capacities as well as information associated with each BGM at each of the one or more capacities. For example, cloud broker 137 transmits a response to SCM 212 that identifies one or more capacities and the desktops/applications available to client machine 108 at each of the capacities. For example, cloud broker 137 may transmit a response indicating that capacity 150 and 154 are available to client machine 108. In such an example, the response may also include information associated with BGM 250a and BGM 250c. For example, the response may include information relating to a corresponding host that each BGM 250 is running on as well as the network protocol that should be used to communicate with the BGM 250. In addition, the response provided by cloud broker 137 also includes information relating to which one or more desktops and/or applications are available at each one of capacities 150 and 154. For example, the response may indicate that both capacities 150 and 154 are able to provide client machine 108 with a certain desktop, such as desktop A, by indicating an identifier of desktop A. The response may also indicate that capacity 154 is able to provide client machine 108 with a certain application, such as application A, by indicating an identifier of application A.

At step 308, the client machine determines the bandwidth rate associated with each capacity by communicating with a corresponding BGM. For example, client machine 108 determines the bandwidth rate associated with each one of capacities 150 and 154 by communicating with BGM 250a and 250c, respectively. As an example, SCM 212 pings (or performs a static data transmission to) BGM 250a in order to determine the bandwidth rate at capacity 150. Similarly, SCM 212 pings BGM 250c to determine the bandwidth rate at capacity 150. As described above, the bandwidth rate associated with a capacity refers to the data transmission speed with which data would be transmitted to client machine 108. In response to SCM 212 pinging a BGM 250, the BGM 250 may perform a data transmission to SCM 212, which enables SCM 212 to determine the bandwidth rate associated with the transmission. For example, SCM 212 may measure the round-trip time associated with pinging the BGM 250 and receiving the data transmission from the BGM 250. Based on the round-trip time, SCM is able to determine the bandwidth rate associated with the capacity at which BGM 250 is located. In certain aspects, SCM 212 performs this procedure (e.g., pining the BGM 250, receiving a response, and measuring the round-trip time) multiple times to determine an average round-trip time, based on which SCM 212 then determines the bandwidth rate. SCM 212 then identifies this bandwidth rate as the bandwidth rate of the capacity at which the BGM 250 is located.

At step 310, the client machine creates bandwidth ratings for each capacity. For example, client machine 108 creates a bandwidth rating for each one of capacities 150 and 154. More specifically, in certain aspects, SCM 212 normalizes a capacity's bandwidth rate, which was determined at step 308, by converting the bandwidth rate to a value on the scale of 0 to 1. In such an example, "1" corresponds to the highest bandwidth rate possible and "0" corresponds to the lowest bandwidth rate possible. The normalized value of a bandwidth rate may be referred to as a bandwidth rating. As an example, at step 308, SCM 212 may determine that the bandwidth rate associated with capacity 150 is 100 megabits per second (Mbps) while the bandwidth rate associated with capacity 154 is 200 Mbps. In such an example, if 200 Mbps is the highest bandwidth possible, then SCM 212 assigns a bandwidth rating of "1" to capacity 154 and a bandwidth rating of "0.5" to capacity 150.

At step 312, the client machine sends a request for a desktop or application to the cloud broker as well as a bandwidth rating for each capacity. As described above, at step 308, SCM 212 is able to determine that desktop A is available at both capacities 150 and 154 based on the response received from cloud broker 137. Having made that determination, when a user of client machine 108 attempts to access desktop A, SCM 212 transmits an identifier of desktop A as well as identifiers of the capacities 150 and 154 and each of the capacities' bandwidth rating to cloud broker 137 (e.g., a bandwidth rating of "1" for capacity 154 and a bandwidth rating of "0.5" for capacity 150). When cloud broker 137 receives client machine 108's request, it is able to determine that client machine 108 is requesting desktop A, which is available at both capacities 150 and 154. As such, cloud broker 137 proceeds to prioritize and select one of the capacities based on one or more priority parameters, as described in relation to step 314. Note that if a certain desktop or application is only available at one capacity, steps 308-314 may not be performed. For example, as described above, at step 306, cloud broker 137 indicates to client machine 108 that application A is only available for provisioning at capacity 154. In such an example, if the user of client machine 108 attempts to access application A, client machine 108 may directly request application A from capacity 154 without steps 308-314 being performed.

At step 314, the cloud broker selects a capacity based on one or more priority parameters. For example, cloud broker 137 prioritizes capacities 150 and 154 and then selects capacity 150 for provisioning desktop A based on one or more priority parameters. As described above, in one example, the priority parameters may include the costs associated with a capacity, the distance between client machine 108 and the capacity, the capacity's current resource availability, the capacity's bandwidth rating, etc.

In certain aspects, for each capacity, cloud broker 137 is previously configured with or may have determined values for the priority parameters described above. For example, cloud broker 137 may be configured with the costs associated with capacity 150 and 154 in advance. Also, based on the location of client machine 108, received at step 304, cloud broker 137 may have determined the distance between client machine 108 and each of capacities 150 and 154. Cloud broker 137 has also already received the bandwidth ratings for capacities 150 and 154 at step 312. Further, cloud broker 137 is able to determine the current resource availability associated with each capacity because, in certain aspects, cloud broker 137 is configured to keep a record of how many compute resources (e.g., VMs) have already been assigned to users of a certain enterprise and how many of the compute resources are still available. In certain aspects, cloud broker 137 provides an interface to an administrator of an enterprise to input or override values of these parameters.

For example, an administrator may set or override costs associated with capacities 150 and 154.

In certain aspects, for each capacity, cloud broker 137 calculates normalized values for each of the parameters above. For example, cloud broker 137 normalizes a value associated with a parameter, such as cost, by converting it to a value on the scale of 0 to 1. This is similar to the normalization of the bandwidth rates described above. Once values of all parameters for each capacity are normalized, cloud broker 137 applies a weight to each of the parameters for each capacity. A weight here represents the importance of a certain parameter in selecting one capacity over another. In certain aspects, cloud broker 137 has a default configuration that defines a set of weights with respect to these priority parameters. However, in certain aspects, the weights may be set or overridden by an administrator through the interface provided by cloud broker 137. Allowing an administrator of an enterprise to set or override these weights is advantageous because the importance of each of these parameters may vary from enterprise to enterprise. For example, for cost saving measures, one enterprise may give much more weight to cost than another enterprise.

In order to prioritize or rank capacities, cloud broker 137 then uses the parameters' normalized values and weights in a formula for each capacity. The following example illustrates such calculations. In this example, for capacity 150, normalized values for cost, current resource availability, distance, and bandwidth rate may be 0.5, 0.2, 0.7, 0.8, respectively. For capacity 154, the normalized values for the same parameters, in that order, may be 0.8, 0.4, 0.4, 0.2, respectively. The weights associated with the same parameters, in that order, may also be 5, 4, 3, 4. In such an example, a normalized priority may be calculated for each capacity as follows:

Normalized Priority for Capacity 150=(5*0.5+4*0.2+ 3*0.7+4*0.8)/(5+4+3+4)=0.54

Normalized Priority for Capacity 154=(5*0.8+4*0.4+ 3*0.4+4*0.2)/(5+4+3+4)=0.48

Cloud broker 137 then ranks capacities based on their normalized priorities. In this example, cloud 150 has a higher priority than cloud 154. Cloud broker 137 then selects cloud 150 for provisioning desktop A that was requested by SCM 212 at step At step 316, the cloud broker indicates the requested desktop or application at the selected capacity to the client machine. For example, in certain aspects, cloud broker 137 indicates an identifier associated with desktop A at capacity 150 to SCM 212.

At step 318, the client machine attempts to connect to the requested desktop or application at capacity A. For example, client machine 108 attempts to connect to desktop A at capacity A. If the connection is not successful, client machine 108 moves to step 320.

At step 320, the client machine notifies the cloud broker of the failed connection with capacity A. For example, client machine 108 notifies cloud broker 137 of the failed connection with capacity 150 and the reason for the failure.

At step 322, the cloud broker selects and indicates the requested desktop or application at the capacity with the second highest priority. For example, cloud broker 137 selects desktop A at capacity 154, which has the second highest priority after capacity 150.

At step 324 the client machine attempts to connect to the requested desktop or application at capacity B. For example, client machine 108 attempts to connect to desktop A at capacity 154. In the example described herein, desktop A is only available at capacities 150 and 154. However, in other examples, if the connection to capacity 154 fails and client machine 108 sends a failure notification to cloud broker 137, cloud broker 137 may select the next capacity with the third highest normalized priority value, etc.

Accordingly, the aspects herein describe a technical solution to a technical problem associated with prioritizing and selecting capacities based on bandwidth rate associated with the capacities and the location of a client machine requesting a certain desktop or application. When prioritizing and selecting capacities for provisioning a desktop or application to a client machine, considering the bandwidth rate associated with each capacity in a list of available capacities as well as the distance between the client machine and each of the capacities may help improve the quality and speed of service that a user of the client machine experiences while using the desktop or application.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims.

Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for selecting one of a plurality of capacities to provide a service to a client machine in a multi-cloud virtual desktop infrastructure (VDI) system, comprising:
   receiving a first request from the client machine for available services;
   transmitting a response to the client machine, wherein:
      the response indicates that a first capacity and a second capacity of the plurality of capacities are both available to provide the service,
      the response identifies a first bandwidth gauge module (BGM) at the first capacity and a second BGM at the second capacity, and
      the client machine communicates with the first BGM and the second BGM to determine a first bandwidth rating associated with the first capacity and a second bandwidth rating associated with the second capacity, respectively;
   receiving a second request for the service from the client machine, wherein the second request indicates the first bandwidth rating associated with the first capacity and the second bandwidth rating associated with the second capacity;
   prioritizing the first capacity over the second capacity based on a first one or more priority parameters associated with the first capacity and a second one or more priority parameters associated with the second capacity, wherein:
      the first one or more parameters comprise the first bandwidth rating, and
      the second one or more parameters comprise the second bandwidth rating; and
   indicating a first identifier of the service associated with the first capacity to the client machine, wherein the client machine uses the first identifier to connect to the service at the first capacity.

2. The method of claim 1, wherein:
   the first request comprises location information of the client machine,
   the first one or more priority parameters comprise a first distance parameter corresponding to a first distance between the location of the client machine and the first capacity, and
   the second one or more priority parameters comprise a second distance parameter corresponding to a second distance between the location of the client machine and the second capacity.

3. The method of claim 1, wherein prioritizing the first capacity and the second capacity further comprises applying a set of weights to the first one or more priority parameters and the second one or more priority parameters.

4. The method of claim 1, further comprising:
   receiving a failure notification from the client machine indicating that a connection of the client machine with the service at the first capacity failed;
   identifying the second capacity as having a second highest priority after the first capacity based on the prioritizing; and
   indicating a second identifier of the service associated with the second capacity to the client machine, wherein the client machine uses the second identifier to connect to the service at the second capacity.

5. The method of claim 1, wherein:
   the first one or more parameters comprise a first resource availability parameter, the first resource availability parameter indicating availability of compute resources at the first capacity for an enterprise associated with the client machine, and
   the second one or more parameters comprise a second resource availability parameter, the second resource availability parameter indicating availability of compute resources at the second capacity for the enterprise.

6. The method of claim 1, wherein:
   the first one or more parameters comprise a first cost associated with the first capacity, and
   the second one or more parameters comprise a second cost associated with the second capacity.

7. An apparatus, comprising:
   a non-transitory memory comprising executable instructions; and
   a processor in data communication with the memory and configured to execute the instructions to cause the apparatus to:
      receive a first request from a client machine for available services;
      transmit a response to the client machine wherein:
         the response indicates that a first capacity and a second capacity of the plurality of capacities are both available to provide a service to the client machine,
         the response identifies a first bandwidth gauge module (BGM) at the first capacity and a second BGM at the second capacity, and
         the client machine communicates with the first BGM and the second BGM to determine a first bandwidth rating associated with the first capacity and a second bandwidth rating associated with the second capacity, respectively;
      receive a second request for the service from the client machine, wherein the second request indicates the first bandwidth rating associated with the first capacity and the second bandwidth rating associated with the second capacity;
      prioritize the first capacity over the second capacity based on a first one or more priority parameters associated with the first capacity and a second one or more priority parameters associated with the second capacity, wherein:
         the first one or more parameters comprise the first bandwidth rating, and the second one or more parameters comprise the second bandwidth rating; and
indicate a first identifier of the service associated with the first capacity to the client machine, wherein the client machine uses the first identifier to connect to the service at the first capacity.

8. The apparatus of claim 7, wherein:
the first request comprises location information of the client machine,
the first one or more priority parameters comprise a first distance parameter corresponding to a first distance between the location of the client machine and the first capacity, and
the second one or more priority parameters comprise a second distance parameter corresponding to a second distance between the location of the client machine and the second capacity.

9. The apparatus of claim 7, wherein the processor being configured to cause the apparatus to prioritize the first capacity and the second capacity comprises the processor being configured to cause the apparatus to apply a set of weights to the first one or more priority parameters and the second one or more priority parameters.

10. The apparatus of claim 7, wherein the processor is further configured to cause the apparatus to:
receive a failure notification from the client machine indicating that a connection of the client machine with the service at the first capacity failed;
identify the second capacity as having a second highest priority after the first capacity based on the first capacity and the second capacity being prioritized; and
indicate a second identifier of the service associated with the second capacity to the client machine, wherein the client machine uses the second identifier to connect to the service at the second capacity.

11. The apparatus of claim 7, wherein:
the first one or more parameters comprise a first resource availability parameter, the first resource availability parameter indicating availability of compute resources at the first capacity for an enterprise associated with the client machine, and
the second one or more parameters comprise a second resource availability parameter, the second resource availability parameter indicating availability of compute resources at the second capacity for the enterprise.

12. The apparatus of claim 7, wherein:
the first one or more parameters comprise a first cost associated with the first capacity, and
the second one or more parameters comprise a second cost associated with the second capacity.

13. A non-transitory computer readable medium having instructions stored thereon that, when executed by a computing system, cause the computing system to perform a method comprising:
receiving a first request from a client machine for available services;
transmitting a response to the client machine, wherein:
the response indicates that a first capacity and a second capacity of the plurality of capacities are both available to provide a service,
the response identifies a first bandwidth gauge module (BGM) at the first capacity and a second BGM at the second capacity, and
the client machine communicates with the first BGM and the second BGM to determine a first bandwidth rating associated with the first capacity and a second bandwidth rating associated with the second capacity, respectively;
receiving a second request for the service from the client machine, wherein the second request indicates the first bandwidth rating associated with the first capacity and the second bandwidth rating associated with the second capacity;
prioritizing the first capacity over the second capacity based on a first one or more priority parameters associated with the first capacity and a second one or more priority parameters associated with the second capacity, wherein:
the first one or more parameters comprise the first bandwidth rating, and
the second one or more parameters comprise the second bandwidth rating; and
indicating a first identifier of the service associated with the first capacity to the client machine, wherein the client machine uses the first identifier to connect to the service at the first capacity.

14. The non-transitory computer readable medium of claim 13, wherein:
the first request comprises location information of the client machine,
the first one or more priority parameters comprise a first distance parameter corresponding to a first distance between the location of the client machine and the first capacity, and
the second one or more priority parameters comprise a second distance parameter corresponding to a second distance between the location of the client machine and the second capacity.

15. The non-transitory computer readable medium of claim 13, wherein prioritizing the first capacity and the second capacity further comprises applying a set of weights to the first one or more priority parameters and the second one or more priority parameters.

16. The non-transitory computer readable medium of claim 13, wherein the method further comprises:
receiving a failure notification from the client machine indicating that a connection of the client machine with the service at the first capacity failed;
identifying the second capacity as having a second highest priority after the first capacity based on the prioritizing; and
indicating a second identifier of the service associated with the second capacity to the client machine, wherein the client machine uses the second identifier to connect to the service at the second capacity.

17. The non-transitory computer readable medium of claim 13, wherein:
the first one or more parameters comprise a first resource availability parameter, the first resource availability parameter indicating availability of compute resources at the first capacity for an enterprise associated with the client machine, and
the second one or more parameters comprise a second resource availability parameter, the second resource availability parameter indicating availability of compute resources at the second capacity for the enterprise.

18. The non-transitory computer readable medium of claim 13, wherein:
the first one or more parameters comprise a first cost associated with the first capacity, and the second one or more parameters comprise a second cost associated with the second capacity.

* * * * *